(12) United States Patent
Sadeghi

(10) Patent No.: US 10,899,097 B2
(45) Date of Patent: Jan. 26, 2021

(54) METHOD FOR MANUFACTURING A HEATING ELEMENT BY 3D PRINTING

(71) Applicant: Mohammad Ali Sadeghi, Toronto (CA)

(72) Inventor: Mohammad Ali Sadeghi, Toronto (CA)

( * ) Notice: Subject to any disclaimer, the term of this patent is extended or adjusted under 35 U.S.C. 154(b) by 0 days.

(21) Appl. No.: 15/974,220

(22) Filed: May 8, 2018

(65) Prior Publication Data
US 2019/0344520 A1 Nov. 14, 2019

(51) Int. Cl.
| | | |
|---|---|---|
| *B29D 99/00* | (2010.01) | |
| *B29C 64/00* | (2017.01) | |
| *B32B 5/00* | (2006.01) | |
| *B32B 7/00* | (2019.01) | |
| *B32B 27/00* | (2006.01) | |
| *A41D 13/00* | (2006.01) | |
| *B29C 64/209* | (2017.01) | |
| *B29C 64/393* | (2017.01) | |
| *B32B 5/02* | (2006.01) | |
| *B32B 7/12* | (2006.01) | |
| *B32B 27/12* | (2006.01) | |
| *B32B 27/20* | (2006.01) | |
| *B32B 27/36* | (2006.01) | |
| *B60N 2/56* | (2006.01) | |

(Continued)

(52) U.S. Cl.
CPC ..... *B29D 99/0092* (2013.01); *A41D 13/0051* (2013.01); *B29C 64/118* (2017.08); *B29C 64/209* (2017.08); *B29C 64/393* (2017.08); *B32B 5/022* (2013.01); *B32B 7/12* (2013.01); *B32B 27/12* (2013.01); *B32B 27/20* (2013.01); *B32B 27/36* (2013.01); *B60N 2/5685* (2013.01); *A41D 2400/12* (2013.01); *B29K 2067/046* (2013.01); *B29K 2507/04* (2013.01); *B29K 2995/0005* (2013.01); *B29L 2031/3005* (2013.01); *B29L 2031/48* (2013.01); *B29L 2031/771* (2013.01); *B32B 2250/03* (2013.01); *B32B 2255/02* (2013.01); *B32B 2255/26* (2013.01); *B32B 2307/202* (2013.01); *B32B 2437/00* (2013.01); *B32B 2601/00* (2013.01); *B32B 2605/003* (2013.01); *Y10T 156/1062* (2015.01)

(58) Field of Classification Search
None
See application file for complete search history.

(56) References Cited

U.S. PATENT DOCUMENTS

| | | | |
|---|---|---|---|
| 2010/0025388 A1* | 2/2010 | Ono | A47C 7/748 219/217 |
| 2017/0106585 A1* | 4/2017 | Nino | B64C 3/26 |

* cited by examiner

*Primary Examiner* — Linda L Gray
(74) *Attorney, Agent, or Firm* — Nasser Ashgriz; UIPatent Inc.

(57) ABSTRACT

The present invention is a composite material which can transfer heat very fast, for many applications such as car seat, wheelchair, stroller, apparel, medical care and therapeutic heating items. The present invention is a heating element to produce heat by applying a power supply, the heating element comprises of an interconnected mesh of a conductive filament deposits by a 3D printer on a non-woven fabric filler which acts as a thermal bed on the 3D printer to form a first layer, wherein the interconnected mesh of a conductive filament comprises of a combination of a plurality of parallel or series conductors with a plurality of connection nodes, and a double-sided adhesive lining to connect the first layer to a covering layer.

7 Claims, 7 Drawing Sheets

(51) Int. Cl.
    *A41D 13/005*    (2006.01)
    *B29C 64/118*    (2017.01)
    *B29K 67/00*    (2006.01)
    *B29L 31/00*    (2006.01)
    *B29L 31/30*    (2006.01)
    *B29L 31/48*    (2006.01)
    *B29K 507/04*    (2006.01)

METHOD FOR MANUFACTURING A HEATING ELEMENT BY 3D PRINTING

FIELD OF THE INVENTION

The present invention relates in general to a heating system, and more particularly to heaters for heating or warming a seat of a motor vehicle or other articles of manufacture.

BACKGROUND OF THE INVENTION

Heated seat are designed to warm a user in cold weathers, and they are mainly used in car seats, baby strollers and wheelchairs. There are also heated clothing, which are designed for cold-weather sports and other outdoor activities, such as downhill skiing, diving, winter time biking and riding a motorcycle, snowmobiling, trekking and for outdoor workers such as construction workers and carpenters.

To heat a seat, a long strip of a heating element, a resistor, is imbedded in the seat, which heats up when an electrical current is run through it. The prior art discloses several different conductive materials, mainly metal wires, which are used as the resistor for heating the seat. The limited flexibility and the bulkiness of the resistors used for this purpose have prompt a search for new ways to heat a seat and to replace the currently used wired elements. One of the issues with metal wires is that they may break. In order to prevent breakage, the wires are altered, which affects their softness, weight and flexibility. Still, the currently used heaters have installation limitations due to their shape and/or their relatively rigid structures, and are subject to damage from repeated usage.

An alternative to metal wires for heating purposes is a carbon fiber, which are also electrically conductive and can generate heat upon passing an electric current. Carbon fibers can be directly sewed into a fabric, without significantly changing the characteristic of the fabric. Since these fabrics are eclectically conductive, they should not be touching each other to prevent short circuit. Therefore, in most applications, carbon fibers are sewed or imbedded into another material in a set of parallel lines. However, because the fibers are heated in a series connection, if there is a break in any location on the fiber, the whole system cannot be heated.

One other problem with the prior art systems is that the base fabric of the heating element is flammable and may ignite because of a short circuit. These systems are not suitable for high temperature applications due to the destruction of the insulating weaving fibers at temperatures exceeding 120° C.

Sheet-like thin flexible heaters made with an electro conductive paint on a sheet of fabric are also used in seat heaters. This method has a cracking potential because of sharp folding, crushing or punching and cannot be used with high temperatures due to destruction of the underlying fabric and thermal decomposition of the polymerized binder in the paint.

The present invention introduces a new method for manufacturing a seated seat or alike to overcome the mentioned drawbacks in the prior arts and also provide a reliable method for manufacturing complex patterns for the heated seats.

SUMMARY OF THE INVENTION

The present invention is a composite material and a method of making the same, which can quickly transfer heat. This material can be used in car seats, wheelchairs, strollers, apparels, medical care and therapeutic heating items, and other items that need to be heated.

The first objective of the present invention is to provide a cost-effective process and a rapid manufacturing process for the heated items.

The second objective of the present invention is to provide an energy efficient manufacturing method of heated items. The present method consumes low amounts of energy by using a 3D printing process.

The third objective of the present invention is to provide a method for manufacturing heated elements which are adaptable to any type of curved surfaces.

The forth objective of the present invention is to provide a uniform thermal distribution over the whole heating surface.

The fifth objective of the present invention is to produce a reduced thickness and light weight heated items.

The sixth objective of the present invention is to provide a product which can be managed and controlled remotely by a mobile or a tablet through a user interface.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

The figures are not intended to be exhaustive or to limit the present invention to the precise form disclosed. It should be understood that the invention can be practiced with modification and alteration, and that the disclosed technology be limited only by the claims and equivalents thereof.

DETAILED DESCRIPTION OF PREFERRED EMBODIMENTS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
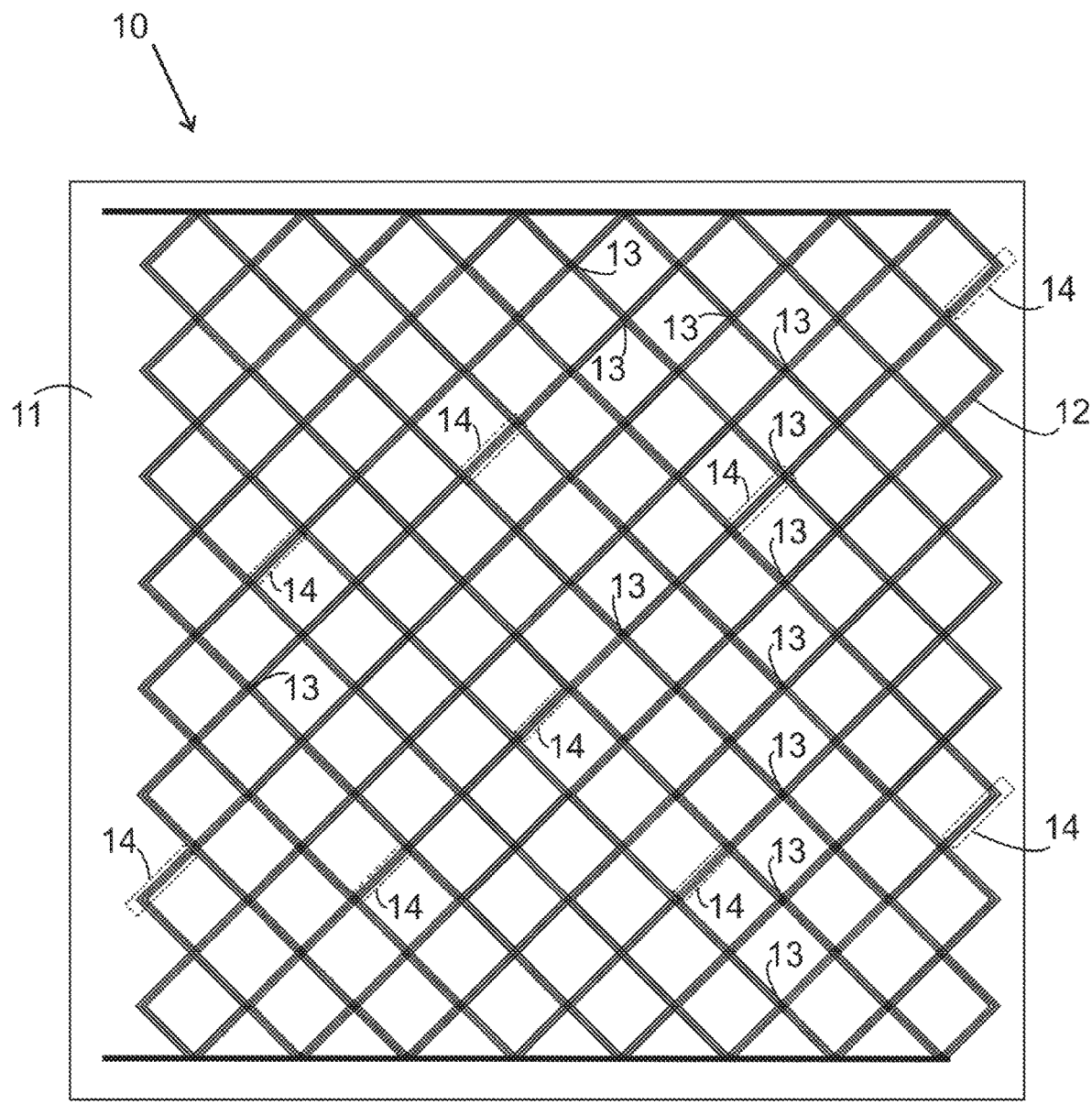
FIG. 1 shows an interconnected mesh of heating element of the present invention.
Figure 2:
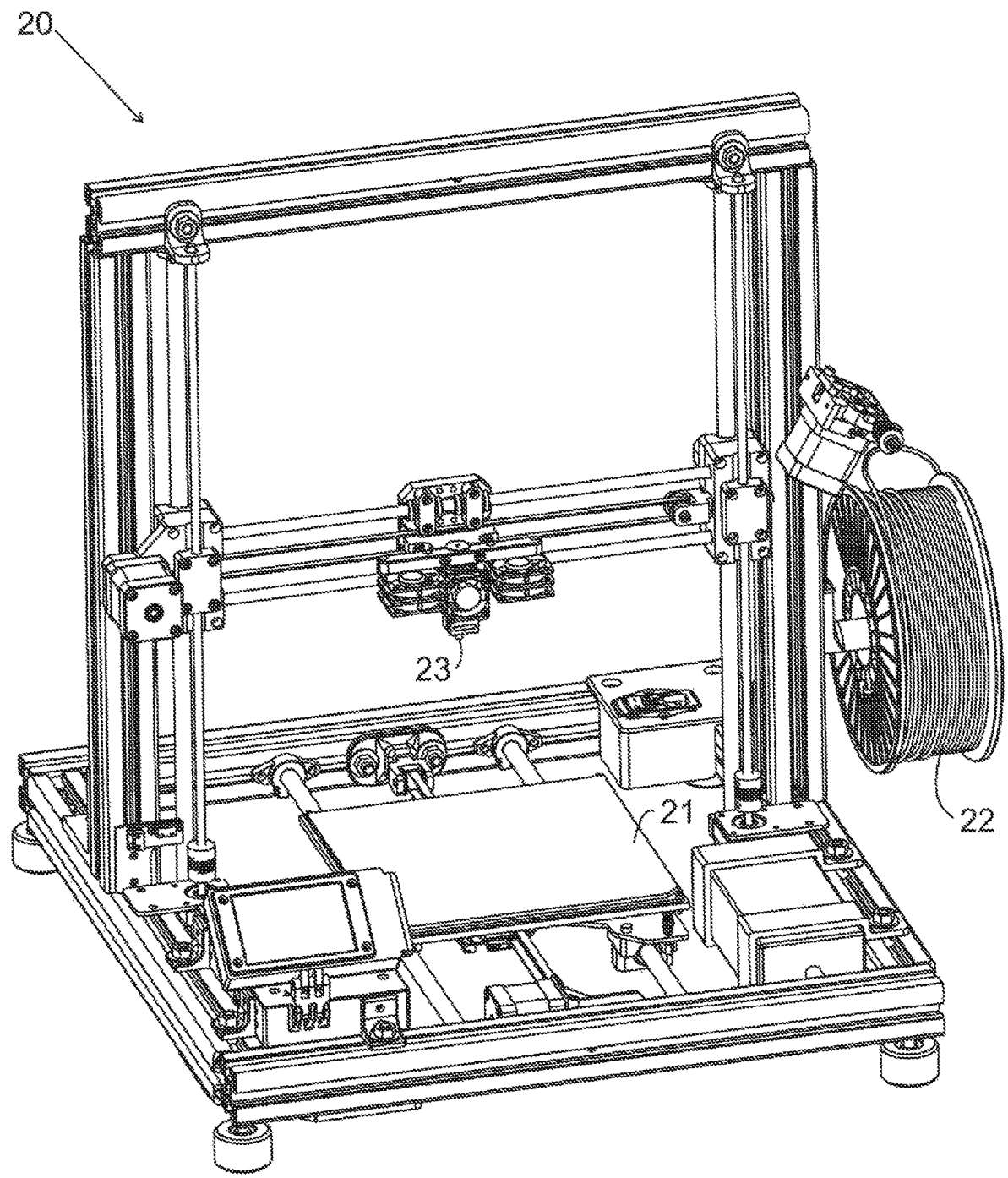
FIG. 2 shows a 3D printer used in the present invention to print a heating element on a fabric.
Figure 3:
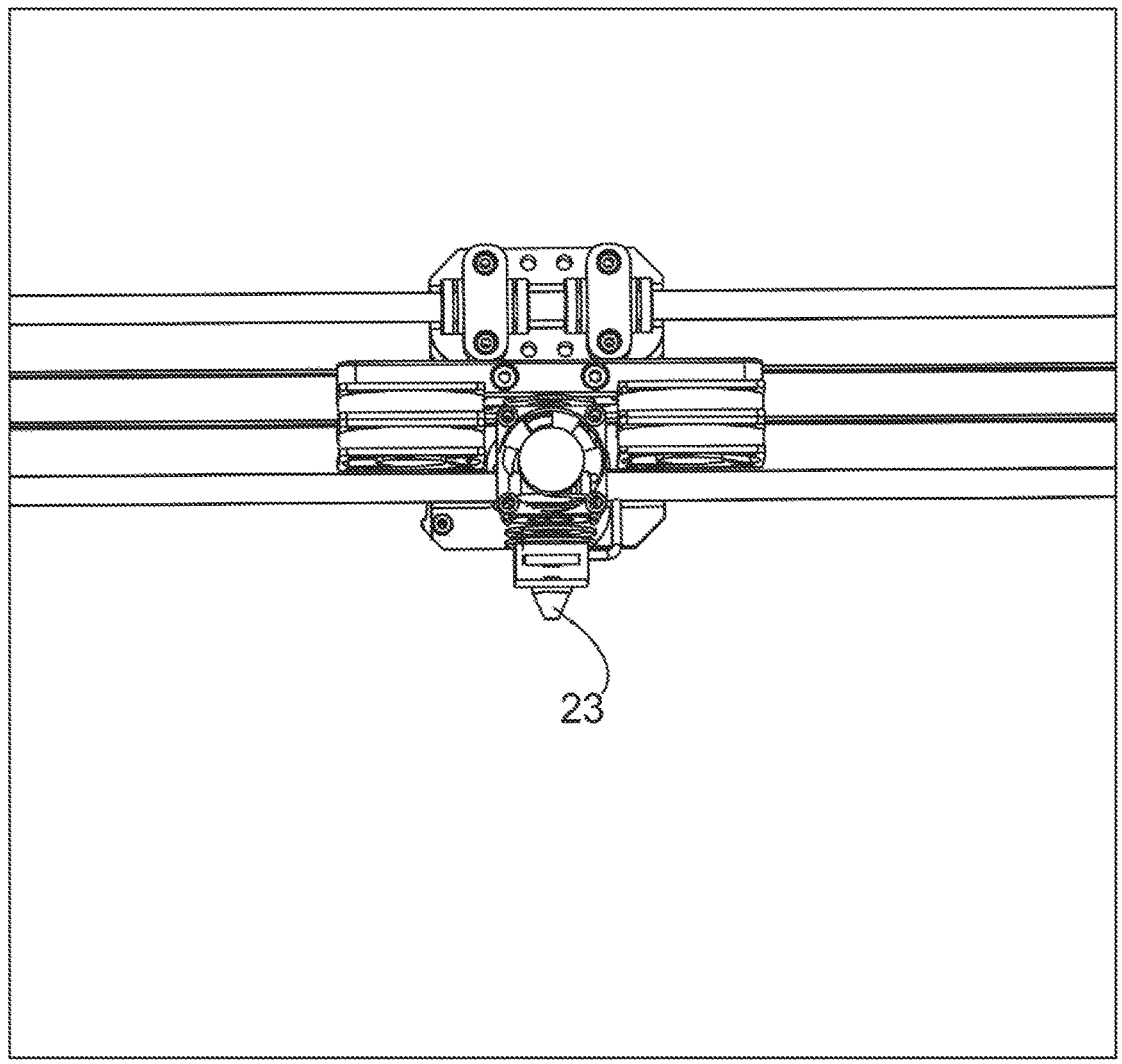
FIG. 3 shows a nozzle used in the present invention to print a heating element on a fabric.

As shown in FIGS. 1 and 2, a first embodiment of the present invention is to produce an interconnected mesh of heating element 10 with a 3D printer 20. The interconnected mesh of heating element 10 can be used in different application to provide heat. The interconnected mesh of heating element 10 comprises of a non-woven fabric filler 11 acts as a thermal bed on a bed 21 of a 3D printer 20.

Again as shown in FIGS. 1 and 2, the 3D printer 20 feeds with a FDM conductive filament 22 and programs to a predefined temperature and a printing pattern 12, therefore the FDM conductive filament 22 prints on the non-woven fabric 11.

Each section 14 of the interconnected mesh of heating element 10 can acts as a conductor 14 in the present invention and based on the variable printing pattern 12, the conductors 14 can be connected parallel or in series or combination of parallel and series to provide a resistance in a circuit of the present invention.

Based on the different type of materials, length of the printed conductor 14 and the width of the printed conductor 14; the whole resistance of the conductor can be measured.

By using a 3D printer 20 in the present invention, a plurality of nodes 13 in the interconnected mesh of heating element 10 are melted together and electronically connected to each other's. The nodes 13 are in perfect shapes to provide parallel or series connection for each conductor 14.

The nozzle 23 temperature and bed 21 temperature are varying based on the different type of FDM 22 materials.

Figure 4:
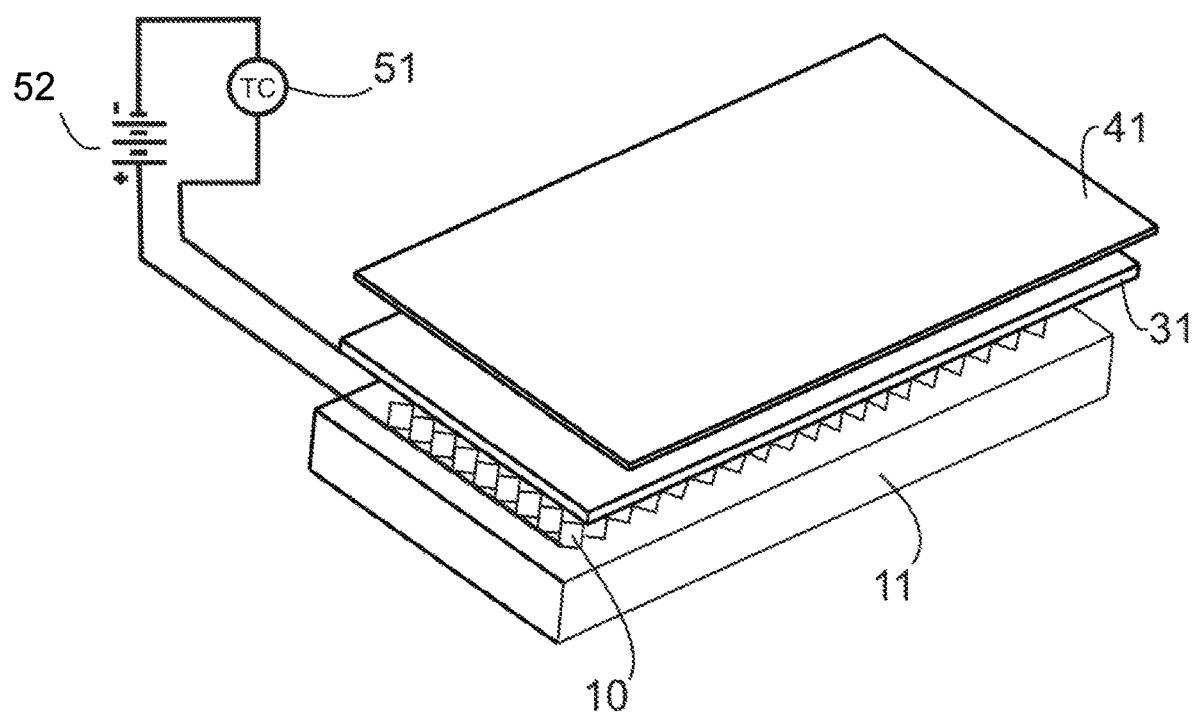
FIG. 4 shows schematic diagram of the heating element in the present invention.

As shown in FIG. 4, by putting a double-sided adhesive lining hot melt 31 (adhesive film) on top of the non-woven fabric 11 with the interconnected mesh of heating element 10 and a layer of gossamer fabric 41 and pressing all the layers on a fusing machine with a predefined pressure and temperature; a heating element for variable applications can be generated. Again as shown in FIG. 4, by applying a power supply 52, the heating element produces heat in entire surface area of the printed filament.

The second embodiment of the present invention is a method for manufacturing a heating element with a 3D printer 20 as shown in FIGS. 1-4. The present invention for manufacturing a heating element comprises of following steps:
cutting a non-woven fabric filler 11 with a cutting machine, the non-woven fabric filler acts as a thermal bed on a bed 21 of a 3D printer 20;
feeding the 3D printer 20 with a FDM conductive filament 22;
programming the 3D printer 20 to a predefined temperature and a printing pattern 12, therefore the FDM conductive filament 22 prints on the non-woven fabric 11;
putting a double-sided adhesive lining hot melt 31 (adhesive film) on top of the non-woven fabric 11 with FDM conductive filament 22;
putting a layer of gossamer fabric 41 on top of the non-woven fabric 11 with FDM conductive filament 22 and the double-sided adhesive lining 31;
pressing all the layers 10, 11, 31 and 41 on a fusing machine with a predefined pressure and temperature.

By connecting two standard core wires to the heating element and a power supply, the heating element produces heat in entire surface area of the printed filament.

The fusing machine in the present invention sticks all the layers 10, 11, 31 and 41 with temperature around 140° C. and pressure of around 2-4 bar and also the iron time will be around 10-15 seconds until all layers 10, 11, 31 and 41 stick together.

The benefits of fusing machine in the present invention is to eliminate fabric shrinkage, bubbling and other distortions, and heat shock effects on the fabric. It also eliminates strike back and strikethrough of adhesive onto fabric surfaces and machinery.

The non-woven fabric filler 11 in the present invention is made by thermal bonding. In the present invention, other material such as a needle punch fabric, a geotextile fabric, a felt sheet, a polyfill sheet, and a polyester wadding can be used as the non-woven fabric filler 11.

The FDM (Fused Deposition Modeling) conductive filament 22 in the present invention mainly comprises of a metal, carbon, and their polymer composites. The feedstock of polymer composites mixed with various forms of carbon has attracted considerable attention because carbon cannot be oxidized and then become nonconductive. In addition, the polymer composites are always thermoplastic.

The present invention can also use conductive PLA (a PLA base combined with black conductive carbon) as the FDM material. The PLA is an environmental protection material, harmless to the human body, non-toxic, and tasteless, which can be the safest option for kids. It also has high impact strength, chemical stability, good electrical properties, and low density. The printing surface with PLA is smooth, moist and high compatibility with post-treatment. One example for PLA is Proto-pasta Conductive PLA and ALFAOHM which is completely non-toxic and odourless.

In the present invention, usage of material with lower resistivity is recommended such as a conductive graphene PLA filament BLAC MAGIC 3D with a volume resistivity of 0.6 ohm-cm and ELECTRIFI filament with a resistivity of 0.006 ohm-cm.

In the present invention, a cotton voile fabric, a gossamer chiffon fabric, a chiffon, a cotton gauze, a tissue, or a textile can be used instead of gossamer fabric.

In the present invention, the printed pattern can be selected from a complex pattern which provide a parallel and series connection for the conductive materials. As shown in FIG. 1, one example of the printed pattern 12 is chain link fence pattern which can provide uniform thermal distribution, cutting in vertical direction for reduce power usage without broken connectivity, proper strength, and a network of combination of series and parallel resistance.

The dc resistance of a conductor is calculated by provided formula (POUILLET'S law)

$$R = (\rho \times L)/A$$

Wherein $\rho$ is the resistivity of the conductor in $\Omega \cdot m$ "ohm meter", L is the Length of conductor in meter, and A is the Cross-sectional area in square meter.

Joule heating, also known as Ohmic heating and resistive heating, is the process by which the passage of an electric current through a conductor produces heat. Joule's first law states that the power of heating generated by an electrical conductor is proportional to the product of its resistance and the square of the current.

$$P = (V_A - V_B)I$$
$$P = IV = I^2 R = \frac{V^2}{R}$$

Here is an example for calculating the length of the filament in the fabric to produce heat. For simplifying the calculation, the connection of the conductors are in series, and only one line of filament is printed in the fabric. The filament material is conductive PLA from ELECTRIFI company and the resistivity of the filament is 0.006 a cm. The battery is a 12 volts DC and the electric current in the circuit is 4 Amps, so we have a power (W) of 48 watts.

Then the range of resistance of printed filament that the present invention can use based on consumption of power usage between minimum 30 Watts to maximum 48 Watts is calculated by $$R_{Max} = \frac{V^2}{P} = 4.8\Omega$$

$$R_{Min} = \frac{V^2}{P} = 3\Omega$$

In considering this resistance in two equal parts in series together, each PWC will have a range of resistance between 1.5Ω to 2.4Ω.

By knowing that the diameter of 3D printer input material is d=1.75 mm (0.175 cm), (different filament has different diameter); the input cross-sectional area is calculated by $$A_{in} = \frac{\pi d^2}{4} = 0.024 \text{ square centimeter}$$

For ELECTRIFI filament with p=0.006 Ω·cm, based on the formula $R=(\rho \times L)/A$ $L_{min}$=(1.5*0.024)/0.006=6 cm and $L_{max}$=(2.4*0.024)/0.006=9.6 cm are determined. By knowing that the volume of input filament is equal to the volume of output printed filament, Volume$_{input}$=Volume$_{output}$ And by considering that the diameter of the 3D printer nozzle 23 is 0.4 mm. Printed layer of filament will be $A_{out}$=3.14(0.04*0.04)/4=0.00125 square centimeter In practice, the printed surface area is not circular, and it is printed like a rectangular strip on the fabric, which has a height of 0.02 cm and width of 0.12 cm, so the $A_{out}$ is recalculated $A_{out}$=height*thick shell=0.02*0.12=0.0024 square centimeter As we can see $A_{in}$=10*$A_{out}$ then length of output of filament printed equal 10 times more than input materials because volume$_{input}$=volume$_{output}$. So the $L_{min-out}$=60 cm and $L_{max-out}$=96 cm are determined.

On the other hand, the raster width and air gap significantly affected the resistivity in the vertical direction, and layer thickness and air gap significantly affected the resistivity in the horizontal direction in 3D printing process of FDM filament. It was evident that process parameters affected the internal structure of printed parts and influenced the resistivity. It also appeared that a wider raster width produced a greater bonding area, which decreased the resistivity in the vertical direction; a greater air gap produced a larger void, which increased the resistivity; increasing either the layer thickness or the air gap produced larger voids and then increased the resistivity in the horizontal direction. Hence, the resistivity of printed parts can be adjusted by carefully changing the process parameters. The study indicates that the resistivity anisotropy ratio can be adjusted from 1.01 to 3.59 by adjusting the raster width.

The present invention did not use many vertical layers. It almost uses only one or two layers, so the horizontal resistivity is more important than the vertical resistivity, and also the layer thickness and air gap significantly affected the resistivity in the horizontal direction. Then for the present invention, $L_{out-min}$ and $L_{out-max}$ are shorter than the ones which calculated before. One suggestion is to consider about half of the length of printed filament.

For printing a complex pattern with different filament materials, combining series and parallel connections and multiple layers; the calculation is more complicated so by trial and error, a result can be achieved.

Figure 5:
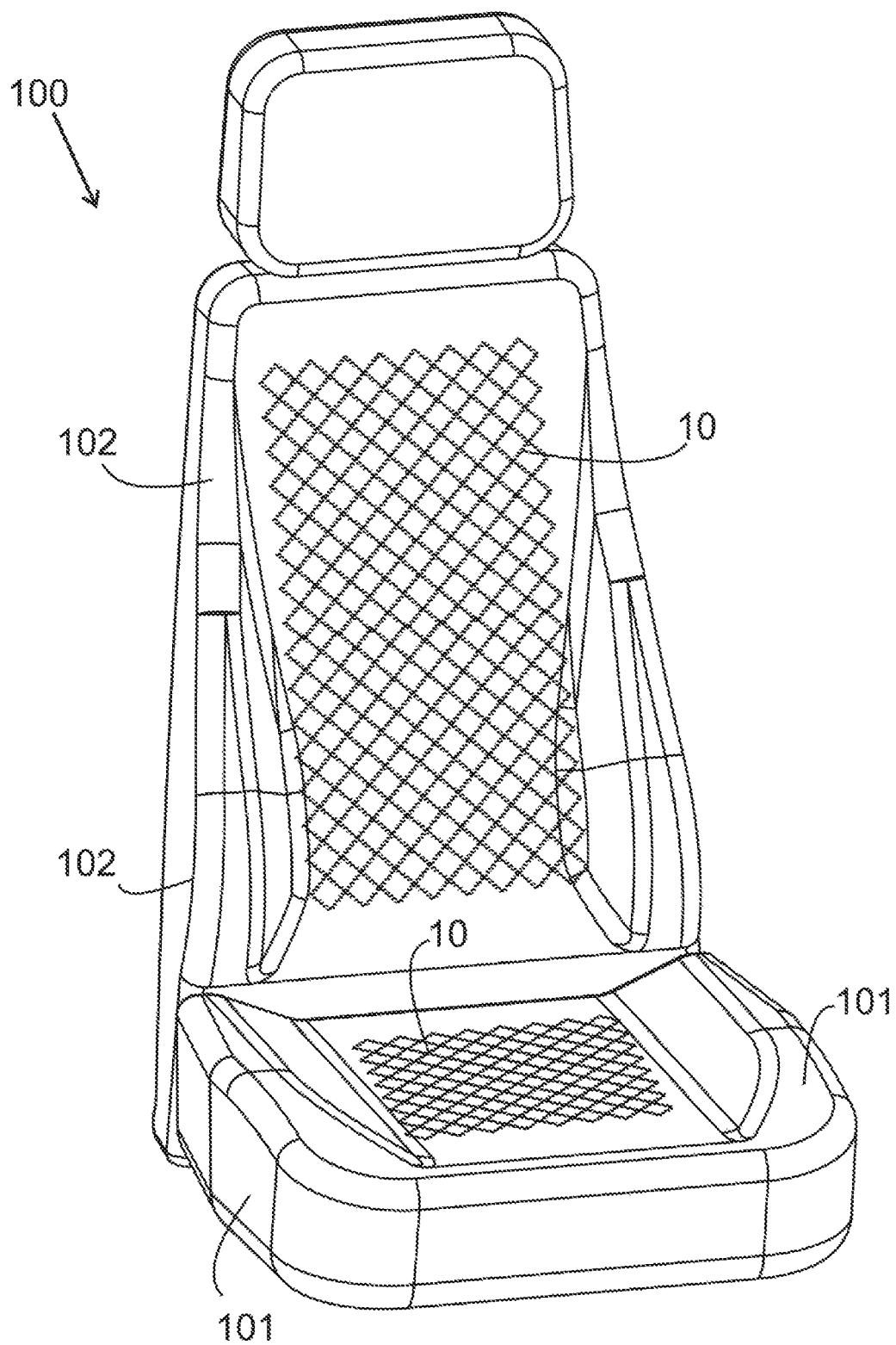
FIG. 5 shows a heating element of the present invention embodied inside a car seat.

In another embodiment of the present invention as shown in FIG. 5, a motor vehicle seat 100 comprises of a seat body portion 101 and a backrest portion 102 connected thereto. Each of these portions 101, 102 includes a base body of foam including a frame 104 and a cushioning material surrounding the frame 104. On the outside the base body of foam is surrounded by a seat cover made of textile or leather. A heating element 10 of the present invention can be disposed between the base body of foam and the seat cover to generate heat for the seat body portion 101 and backrest portion 102.

In another embodiment of the present invention, for producing center point heating, inside the printing circuit, some electro thermal items or equipment such as ICs, Thermoelectric Generator Modules, PTC Heating Element, scrap or unused ICs for example reused CPUs, ceramic electric heating items can be used with any voltage regulator such as Zener Diode Regulator.

In another embodiment of the present invention, for producing center point heating inside the printing circuit, different type of FDM material with different resistance and width can be used.

In another embodiment of the present invention as shown in FIG. 4, a thermal protector 51 can be used in the present invention. The thermal protector 51 acts when overheat and overload happens in the printed circuit. The thermal protector 51 in the present invention is selected from the groups consisting of a bimetal thermostat electric, a thermostat regulator, or a thermo switch.

In another embodiment of the present invention, for monitoring or controlling temperature or humidity in any application of the present invention; a temperature or humidity sensors with temperature and humidity controllers can be installed. The controllers can be controlled by a mobile application through a user interface.

Figure 6:
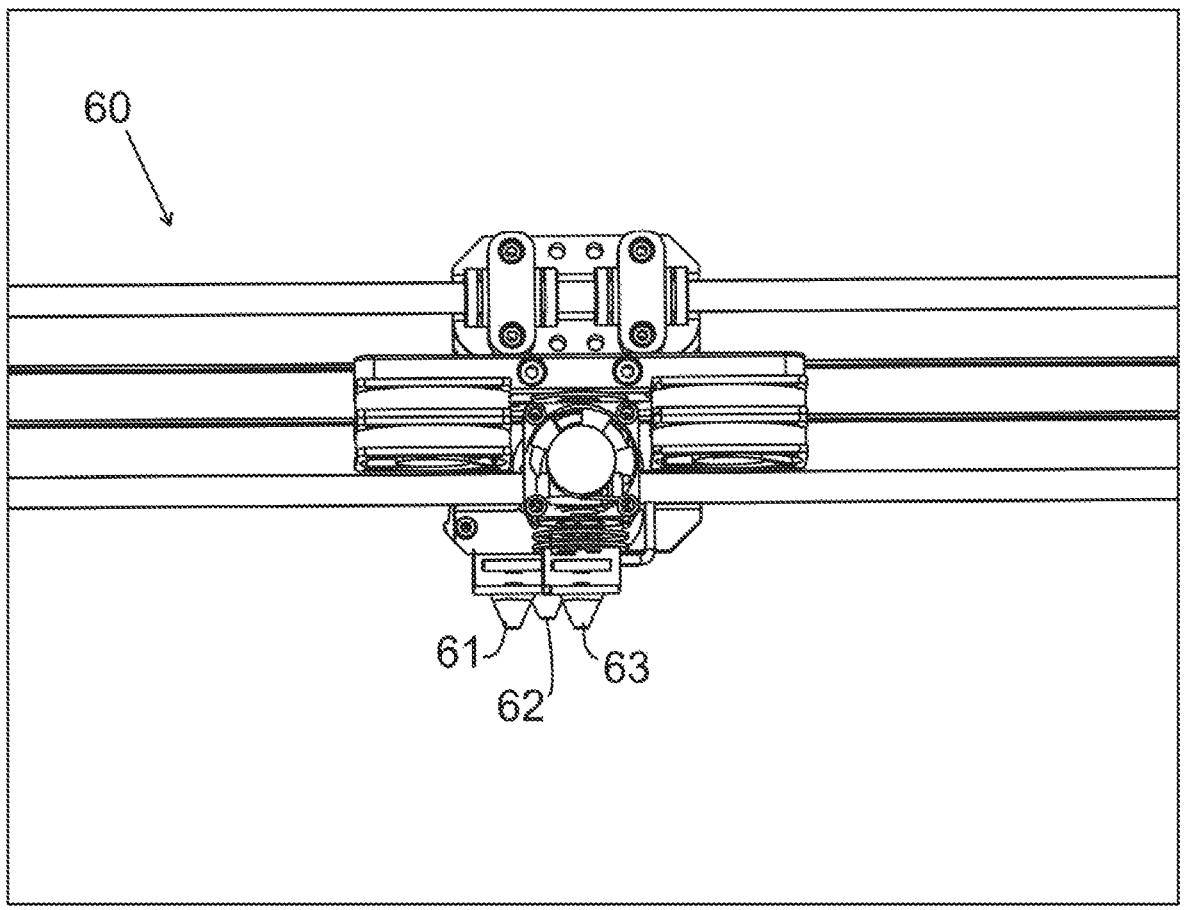
FIG. 6 shows a plurality of nozzles used in the present invention to print several layers at the same time.

In another embodiment of the present invention as shown in FIG. 6, a 3D printer 60 having multi nozzles 61-63 for increasing speed process. Furthermore, the present invention can use a 3D printer 60 with multi nozzles 61-63 by different input filament for increasing the speed process and applying the double-sided glue and the covering layer by 3D printing.

Figure 7:
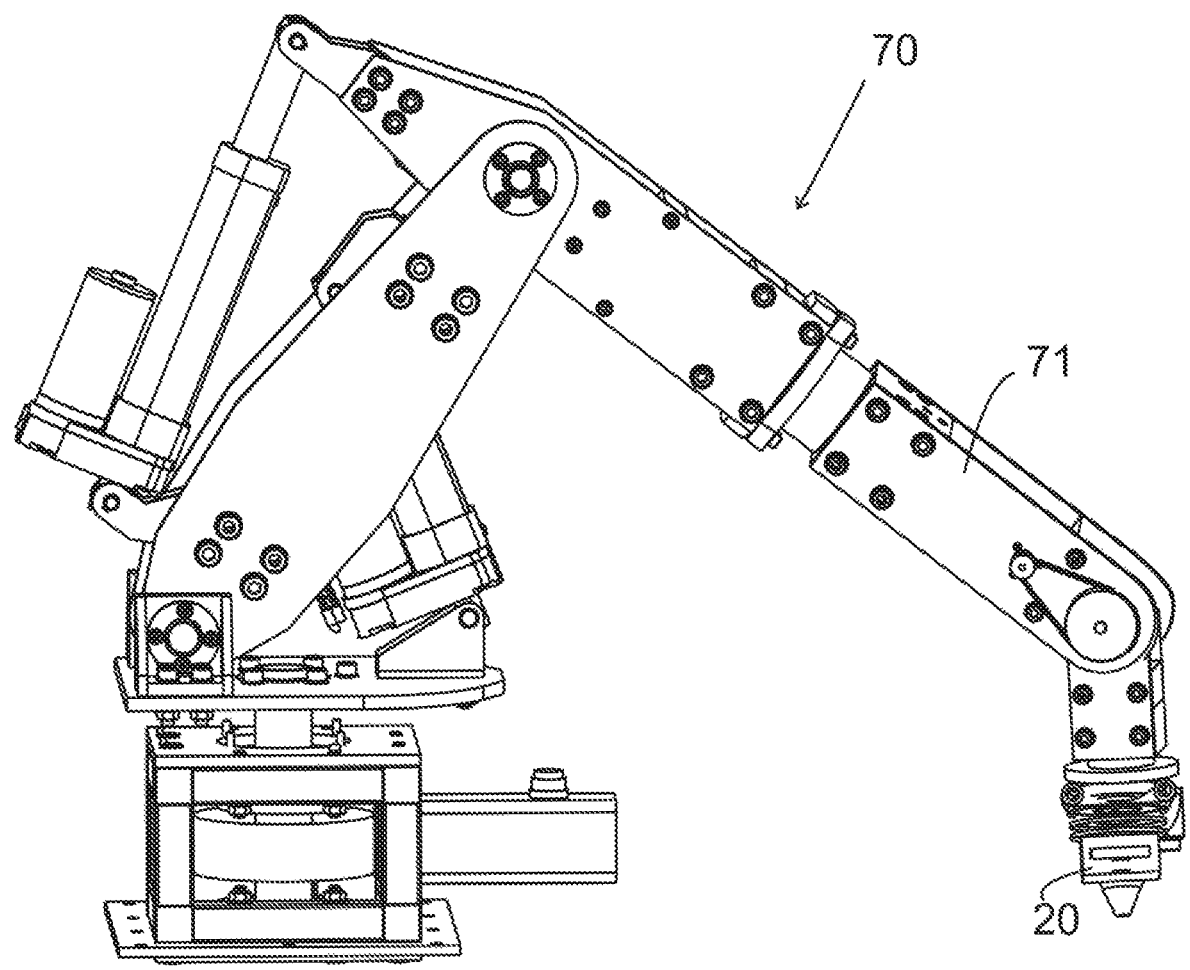
FIG. 7 shows a perspective view of a 3D printer operated by a robot.

For continues production, as shown in FIG. 7, the present invention can use 3D printing with robots 70 which has 6-Axis Arm. The six-axis robotic arm 71 is capable of printing continuous filament composites.

In the present invention, the heating element can provide heat by a power supply with different voltage. The voltage of the power supply can be selected from 12 volts, less than 12 volts or higher than 12 volts. It can also use a rechargeable battery for the power supply.

By the present method, producing a 3D conductor can be possible to provide heat in three dimensions with combination of parallel and series connections.

In another embodiment of the present invention, a 3D conductor can be manufactures in a plurality of layers to achieve to a desirable resistivity of a product.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A method for manufacturing a heating element comprising steps of:
   a) cutting a non-woven fabric filler to a predefined dimension, the non-woven fabric filler acts as a thermal bed on a 3D printer;
   b) feeding the 3D printer with a conductive filament;
   c) programming the 3D printer to a predefined temperature;
   d) placing the non-woven fabric filler on the 3D printer;
   e) printing an interconnected mesh of a conductive filament deposits by the 3D printer on the non-woven fabric filler which acts as a thermal bed on said 3D printer to form a first layer, wherein said interconnected mesh of a conductive filament comprises of a combination of a plurality of parallel or series conductors with a plurality of connection nodes;
   f) putting a double-sided adhesive lining on top of the non-woven fabric with said conductive filament to form a second layer;
   g) putting a covering layer on top of the non-woven fabric with said conductive filament and said double-sided adhesive lining to form a third layer, and
   h) pressing said first, second and third layers with a predefined pressure and temperature.

2. The method of claim 1, wherein a resistance of said conductive filament is between 0.001 ohm-cm to 10 ohm-cm.

3. The method of claim 1, wherein said conductive filament is selected from the groups consisting of a FDM conductive filament, a conductive PLA, and a conductive graphene PLA.

4. The method of claim 1, wherein said non-woven fabric filler is selected from the groups consisting of a needle punch fabric, a geotextile fabric, a felt sheet, a polyfill sheet, and a polyester wadding.

5. The method of claim 1, wherein said covering layer is selected from the groups consisting of a cotton voile fabric, a gossamer chiffon fabric, a chiffon, a cotton gauze, a tissue, and a textile.

6. The method of claim 1, wherein said heating element is used in a car seat to provide heat.

7. The method of claim 1, wherein said heating element is used in an apparel to provide heat.

* * * * *